United States Patent
Ishihara et al.

(10) Patent No.: US 9,136,517 B2
(45) Date of Patent: *Sep. 15, 2015

(54) MICROPOROUS FILM, PROCESS FOR PRODUCTION OF THE FILM, AND USE OF THE FILM

(75) Inventors: Takeshi Ishihara, Nasushiobara (JP); Koichi Kono, Nasushiobara (JP); Satoshi Miyaoka, Nasushiobara (JP); Patrick Brant, Seabrook, TX (US)

(73) Assignee: Toray Battery Separator Film Co., Ltd. (JP)

( * ) Notice: Subject to any disclaimer, the term of this patent is extended or adjusted under 35 U.S.C. 154(b) by 333 days.

This patent is subject to a terminal disclaimer.

(21) Appl. No.: 13/816,328

(22) PCT Filed: Aug. 2, 2011

(86) PCT No.: PCT/JP2011/067703
§ 371 (c)(1),
(2), (4) Date: Feb. 11, 2013

(87) PCT Pub. No.: WO2012/020671
PCT Pub. Date: Feb. 16, 2012

(65) Prior Publication Data
US 2013/0164598 A1     Jun. 27, 2013

Related U.S. Application Data

(60) Provisional application No. 61/373,105, filed on Aug. 12, 2010.

(51) Int. Cl.
| | | |
|---|---|---|
| C08J 9/28 | (2006.01) | |
| B29C 55/02 | (2006.01) | |
| H01M 2/16 | (2006.01) | |
| B32B 3/26 | (2006.01) | |
| B32B 5/00 | (2006.01) | |
| B32B 7/02 | (2006.01) | |
| B32B 27/08 | (2006.01) | |
| C08J 5/18 | (2006.01) | |
| H01M 2/14 | (2006.01) | |
| B29K 23/00 | (2006.01) | |
| B29K 105/04 | (2006.01) | |
| B29C 55/06 | (2006.01) | |
| B29C 55/08 | (2006.01) | |
| B29C 55/12 | (2006.01) | |
| H01M 10/0525 | (2010.01) | |

(52) U.S. Cl.
CPC ............... *H01M 2/1653* (2013.01); *B32B 3/26* (2013.01); *B32B 5/00* (2013.01); *B32B 7/02* (2013.01); *B32B 27/08* (2013.01); *C08J 5/18* (2013.01); *H01M 2/145* (2013.01); *H01M 2/1686* (2013.01); *B29C 55/06* (2013.01); *B29C 55/08* (2013.01); *B29C 55/12* (2013.01); *B29K 2023/04* (2013.01); *B29K 2023/10* (2013.01); *B29K 2105/04* (2013.01); *C08J 2323/02* (2013.01); *C08J 2323/06* (2013.01); *C08J 2323/10* (2013.01); *C08J 2323/20* (2013.01); *H01M 10/0525* (2013.01); *Y02T 10/7011* (2013.01); *Y10T 428/2495* (2015.01); *Y10T 428/249978* (2015.04)

(58) Field of Classification Search
CPC ......... C08L 23/08; C08L 23/12; C08L 23/18; C08L 2205/03; C08J 2323/12; C08J 2323/06; C08J 2323/18
USPC ........ 429/145, 254; 521/134; 428/213, 315.5, 428/220
See application file for complete search history.

(56) References Cited

U.S. PATENT DOCUMENTS

| | | | |
|---|---|---|---|
| 5,084,534 A | 1/1992 | Welborn, Jr. et al. | |
| 2009/0117453 A1* | 5/2009 | Kikuchi et al. | ............... 429/145 |
| 2013/0302696 A1* | 11/2013 | Ishihara et al. | ............... 429/253 |

FOREIGN PATENT DOCUMENTS

| | | |
|---|---|---|
| JP | 6-336535 A | 12/1994 |
| JP | 7-220714 A | 8/1995 |
| JP | 8-250097 A | 9/1996 |
| JP | 10-279718 A | 10/1998 |
| JP | 2003-142064 A | 5/2003 |
| JP | 2004-224915 A | 8/2004 |
| JP | 2005-255876 A | 9/2005 |
| JP | 2005-322644 A | 11/2005 |
| JP | 2009-045774 A | 3/2009 |
| JP | 2010-092718 A | 4/2010 |
| WO | 97/23554 A1 | 7/1997 |
| WO | 2006/137540 A1 | 12/2006 |
| WO | 2007/010878 A1 | 1/2007 |
| WO | 2007/132942 A1 | 11/2007 |
| WO | 2008/016174 A1 | 2/2008 |
| WO | 2008/140835 A1 | 11/2008 |

OTHER PUBLICATIONS

Thomas Sun et al., "Effect of Short Chain Branching on the Coil Dimensions of Polyolefins in Dilute Solution," Macromolecules, 2001, vol. 34, No. 19, pp. 6812-6820 (Abstract only).

* cited by examiner

*Primary Examiner* — Nathan M Nutter
(74) *Attorney, Agent, or Firm* — DLA Piper LLP (US)

(57) ABSTRACT

The invention relates to microporous polymeric membranes suitable for use as battery separator film. The membrane comprises polyethylene, polypropylene, and polymethylpentene. The invention also relates to a method for producing such a membrane, batteries containing such membranes as battery separators, methods for making such batteries, and methods for using such batteries.

33 Claims, 1 Drawing Sheet

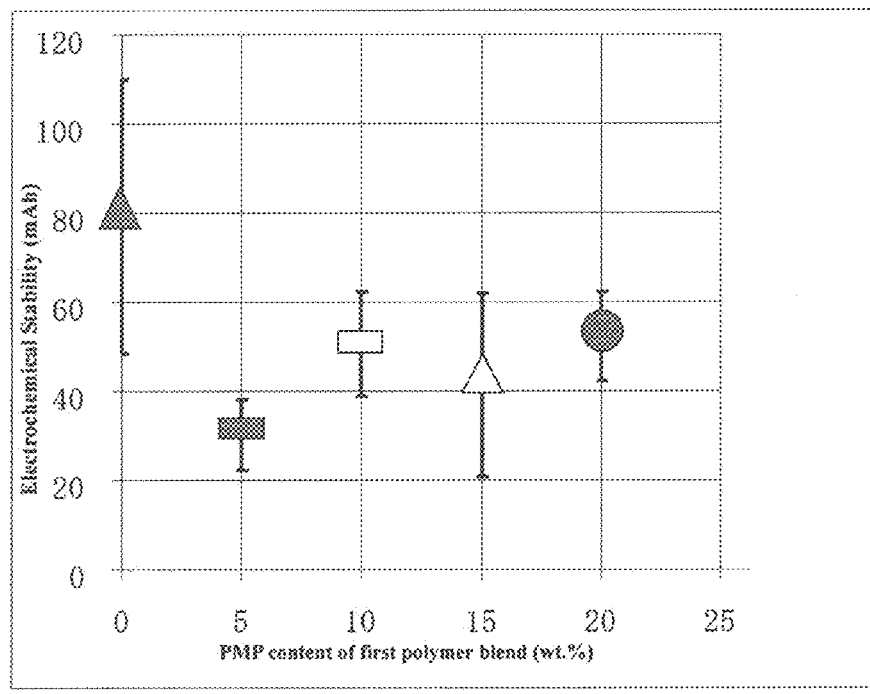

MICROPOROUS FILM, PROCESS FOR PRODUCTION OF THE FILM, AND USE OF THE FILM

FIELD OF THE INVENTION

The invention relates to microporous polymeric membranes suitable for use as battery separator film. The invention also relates to methods for producing such a membrane, batteries containing such membranes as battery separators, methods for making such batteries, and methods for using such batteries.

BACKGROUND OF THE INVENTION

Microporous membranes can be used as battery separator film ("BSF") in, e.g., primary and secondary lithium batteries, lithium polymer batteries, nickel-hydrogen batteries, nickel-cadmium batteries, nickel-zinc batteries, silver-zinc secondary batteries, etc. When microporous polyolefin membranes are used for battery separators, particularly lithium ion battery separators, the membranes' characteristics significantly affect the battery's properties, productivity and performance. Accordingly, it is desirable for the microporous membrane to have a relatively high meltdown temperature and be electrochemically-stable during battery manufacturing and use, particularly in batteries subjected to relatively high temperatures as can occur under overcharge or rapid-discharge conditions.

Electrochemically-stable microporous membranes having a relatively high meltdown temperature have been produced from polypropylene. For example, Japanese Patent Application JP10-279718 discloses multi-layer microporous membranes having outer layers comprising polypropylene, the polypropylene content of the outer layers being in the range of 80 wt. % to 100 wt. %. While these membranes have a relatively high meltdown temperature and electrochemical stability, the large amount of polypropylene in the outer layer undesirably lessens the membrane's electrolyte affinity and increases the membrane's moisture retention.

Japanese Patent Application JP2009-45774 discloses a multi-layer microporous film comprising first layer including polypropylene polymer and second layer, wherein first layer includes thermoplastic polymer having crystallization melt peak temperature ≥170.0° C., e.g., polyester polymer or polymethylpentene (PMP) polymer. As a result, the film improves breakdown property compared to conventional microporous film, but its electrochemical stability does not become enough state because the skin layers include polypropylene polymer.

Japanese Patent Application JP2003-142064 and Japanese Patent Application JP2004-224915 disclose microporous membrane comprising 4-methyl-1-penten copolymer or polymetylpentene polymer. There membrane improve heat-resistant, but the balance of it and other properties is worse.

Japanese Patent Application JP8-250097 discloses that a multi layer membrane comprises three layers (A/B/A), wherein layer A contains poly(4-methylpenten-1). This multi layer membrane has an improved shutdown property, but the balance of it and other properties is worse.

There is therefore a need for microporous membranes having an improved balance of electrochemical stability, high meltdown temperature, high electrolyte affinity, and low moisture retention.

SUMMARY OF THE INVENTION

In one aspect, provided is a membrane comprising a layer containing a polymer blend, the polymer blend comprising 45.0 wt. % to 77.0 wt. % polypropylene, 1.0 wt. % to 18.0 wt. % polymethylpentene, and 5.0 wt. % to 54.0 wt. % polyethylene, based on the weight of the polymer blend, wherein the membrane is microporous and has an electrochemical stability ≤50.0 mAh.

In another aspect, provided is a method for producing a microporous membrane, comprising; forming a first mixture comprising a first diluent, polymethylpentene, and polypropylene, wherein the first mixture contains 1.0 wt. % to 18.0 wt. % of the polymethylpentene and 45.0 wt. % to 77.0 wt. % of the polypropylene based on the total weight of polymer in the first mixture; producing a sheet comprising a first layer comprising the first mixture; and removing at least a portion of the first diluent from the sheet.

In yet another aspect, provided is a battery separator film comprising a layer containing a polymer blend, the polymer blend comprising 60.0 wt. % to 70.0 wt. % polypropylene, 3.0 wt. % to 6.0 wt. % polymethylpentene, and 24.0 wt. % to 37.0 wt. % of a polyethylene, based on the weight of the polymer blend, wherein battery separator film has an electrochemical stability ≤25.0 mAh, a thickness ≤50.0 µm, a meltdown temperature ≥170.0° C., and a normalized air permeability ≤40.0 seconds/100 cm$^3$/µm.

In yet another aspect, provided is a battery separator film comprising a layer containing a polymer blend, the polymer blend comprising 57.0 wt. % to 67.0 wt. % polypropylene, more than 6.0 wt. % and 12.0 wt. % or less polymethylpentene, and 21.0 wt. % to 37.0 wt. % of a polyethylene, based on the weight of the polymer blend, wherein battery separator film has an electrochemical stability ≤25.0 mAh, a thickness ≤50.0 µm, a meltdown temperature ≥170.0° C., and a normalized air permeability ≤40.0 seconds/100 cm$^3$/µm.

Effect of the Invention

The present invention provides microporous membranes having an improved balance of electrochemical stability, high meltdown temperature, high electrolyte affinity and low moisture retention.

BRIEF DESCRIPTION OF THE FIGURE

The FIGURE shows the variation of electrochemical stability as a function of polymethylpentene content for the membrane of Examples 1-8.

DETAILED DESCRIPTION OF THE INVENTION

Although microporous membranes comprising >85.0 wt. % polypropylene have higher meltdown temperature and improved electrochemical stability over polyethylene membranes, the high polypropylene content leads to reduced electrolyte affinity (as measured by electrolytic solution absorption speed). Hydrophilizing treatments have been used to improve membrane electrolyte affinity, but such treatments can be undesirable because they increase the amount of moisture absorbed by the membrane. The membranes of the invention have a higher meltdown temperature and electrochemical stability than those of conventional microporous membranes, such as those having outer layers comprising >85.0 wt. % polypropylene, and do not need a hydrophilizing post-treatment to reach the desired level of electrolyte affinity.

For the purpose of this description and the appended claims, the term "polymer" means a composition including a plurality of macromolecules, the macromolecules containing recurring units derived from one or more monomers. The macromolecules can have different size, molecular architecture, atomic content, etc. The term "polymer" includes macromolecules such as copolymer, terpolymer, etc. "Polyethylene" means polyolefin containing ≥50.0% (by number) recurring ethylene-derived units, preferably polyethylene homopolymer and/or polyethylene copolymer wherein at least 85% (by number) of the recurring units are ethylene units. "Polypropylene" means polyolefin containing >50.0% (by number) recurring propylene-derived units, preferably polypropylene homopolymer and/or polypropylene copolymer wherein at least 85% (by number) of the recurring units are propylene units. "Polymethylpentene" means polyolefin containing ≥50.0% (by number) recurring methylpentene-derived units, preferably polymethylpentene homopolymer and/or polymethylpentene copolymer wherein at least 85% by (number) of the recurring units are methylpentene units. A "microporous membrane" is a thin film having pores, where ≥90.0 percent (by volume) of the film's pore volume resides in pores having average diameters in the range of from 0.01 µm to 10.0 µm. With respect to membranes produced from extrudates, the machine direction ("MD") is defined as the direction in which an extrudate is produced from a die. The transverse direction ("TD") is defined as the direction perpendicular to both MD and the thickness direction of the extrudate. MD and TD can be referred to as planar directions of the membrane, where the term "planar" in this context means a direction lying substantially in the plane of the membrane when the membrane is flat.

Membrane Structure

In an embodiment, the membrane is microporous and comprises layers including a polymer blend, the blend comprising about 45.0 wt. % to about 80.0 wt. % polypropylene, about 1.0 wt. % to about 15.0 wt. % polymethylpentene, and about 5.0 wt. % to about 54.0 wt. % polyethylene, based on the weight of the polymer blend. In another embodiment, the membrane comprises first and second layers, the first layer containing a first polymer blend, wherein the first polymer blend comprises about 45.0 wt. % to about 77.0 wt. % polypropylene, about 1.0 wt. % to about 18.0 wt. % polymethylpentene, and about 5.0 wt. % to about 54.0 wt. % polyethylene, based on the weight of the first polymer blend, and wherein the second layer contains polymer or a second polymer blend, such as a blend of polyolefin.

Optionally, the first and second layers are in contact in an A/B arrangement, with "A" representing the first layer and "B" representing the second layer. The membrane can further comprise additional layers (e.g., "C", "D", etc.) which are optionally porous or microporous and comprise polymer. For example, the membranes can have structures such as A/B/A, A/B/A/B, A/B/C, A/B/C/B/A, etc. The layers can be in planar contact, e.g., a planar face of a first layer in contact with a planar face of a second layer. In an embodiment, at least one of the membrane's two outer surfaces comprises the first (i.e., "A") layer. For example, the membrane can comprise first, second, and third layers, the second layer being located between the first and third layers, wherein (i) the first layer contains a first polymer blend comprising about 45.0 wt. % to about 77.0 wt. % polypropylene, about 1.0 wt. % to about 18.0 wt. % polymethylpentene, and about 5.0 wt. % to about 54.0 wt. % polyethylene, based on the weight of the first polymer blend, (ii) the second layer contains polymer such as polyolefin or a second polymer blend, and (iii) the third layer contains a third polymer blend, the third polymer blend comprising about 45.0 wt. % to about 80.0 wt. % polypropylene, about 1.0 wt. % to about 15.0 wt. % polymethylpentene. Optionally, the first and third polymer blends each comprise about 2.0 wt. % to about 15.0 wt. % polymethylpentene, e.g., about 3.0 wt. % to about 12.0 wt. % polymethylpentene and about 5.0 wt. % to about 54.0 wt. % polyethylene, based on the weight of the first or third polymer blend as the case may be.

Optionally, the membrane further comprises additional inner layers. Optionally, the first and third layers are outer layers of the membrane and have substantially the same composition and optionally substantially the same thickness. When the membrane comprises two or more layers, the second layer's thickness is optionally ≥ (or >) the first layer's thickness, e.g., ≥ (or >) each of the first and third layer's thicknesses. For example, in one embodiment the membrane is a three-layer membrane wherein (i) the first and third layers have substantially the same thickness and (ii) wherein the thickness of the second layer is in the range of about 1.1 times to about 5.0 times the thickness of the first layer.

Membrane Composition

In an embodiment, the first polymer blend comprises polypropylene, polymethylpentene, and polyethylene; and the optional second polymer blend comprises polyethylene. Examples of polypropylene, polymethylpentene, and polyethylene useful in these blends will now be described, but the invention is not limited thereto, and this description is not meant to foreclose the presence of additional or alternative polymers within the broader scope of the invention.

Polymethylpentene

In an embodiment, the polymethylpentene ("PMP") comprises polymer or copolymer wherein at least 80.0% (by number) of the recurring units are units derived from methylpentene. The desired PMP has a melting temperature (Tm) ≥200.0° C., e.g., in the range of from 200.0° C. to 250.0° C., such as from about 210.0° C. to about 240.0° C., or from about 223.0° C. to about 235.0° C. It has been observed that when the membrane contains PMP having a Tm >240.0° C., and particularly >250.0° C., it is more difficult to produce a membrane that does not exhibit a loss of mechanical strength when exposed to a temperature >170.0° C. While not wishing to be bound by any theory or model, it is believed that this results from the difficulty in producing a uniform mixture of PMP and PE when the difference between PE Tm and PMP Tm is large. It has also been observed that when the membrane contains PMP having a Tm <200.0° C., it is more difficult to produce a membrane having a relatively high meltdown temperature. The PMP's Tm can be determined by differential scanning calorimetry methods similar to those described below for polypropylene.

In an embodiment, the PMP has a melt flow rate ("MFR" measured according to ASTM D 1238; 260° C./5.0 kg)≤80.0 dg/min., for example in the range of from about 0.1 dg/min. to about 60.0 dg/min., such as from, or about 0.3 dg/min to about 40.0 dg/min, e.g., in the range of 0.5 dg/min to 30.0 dg/min. Optionally, the MFR is in the range of (i) about 0.1 dg/min to about 28.0 dg/min, (ii) about 0.1 to about 1.0 dg/min, or (iii) about 20.0 to about 24.0 dg/min. When the MFR of PMP is >80.0 dg/min., it can be more difficult to produce a membrane having a relatively high meltdown temperature. In one or more embodiments, the PMP has a weight average molecular weight ("Mw") in the range of about $1.0 \times 10^4$ to about $4.0 \times 10^6$ and a molecular weight distribution ("MWD" defined as Mw divided by the number average molecular weight, "Mn") ≤20.0. The PMP's Mw and MWD can be determined by gel permeation chromatography methods similar to those described below for polypropylene, as exemplified in *"Macromolecules*, Vol. 38, pp. 7181-7183 (2005)."

The PMP can be produced, e.g., in a polymerization process using a Ziegler-Natta catalyst system (such as catalyst systems containing titanium or titanium and magnesium) or a "single site catalyst." In an embodiment, the PMP is produced by coordination polymerization using methylpentene-1 monomer, such as 4-methylpentene-1, or methylpentene-1 with one or more comonomers such as α-olefin. Optionally, the α-olefin is one or more of butene-1, pentene-1, 3-methylbutene-1, hexene-1, 4-methylpentene-1, heptene-1, octene-1, nonene-1, and decene-1. Cyclic comonomer(s) such as cyclopentene, 4-methylcyclopentene, norbornene, tricyclo-3-decene, etc., can also be used. In an embodiment, the comonomer is hexene-1, octene-1. In other embodiments, the comonomer has a number of carbon atoms in the range of $C_{10}$ to $C_{18}$, e.g., $C_{16}$ to $C_{18}$. The comonomer content in the PMP is generally ≤20.0 mol. %.

The PMP can be a mixture of PMPs (e.g., dry mixed or a reactor blend), to produce a mixture having a Tm ≤250.0° C., e.g., ≤240.0° C.

Polyethylene

In an embodiment, the polyethylene ("PE") comprises a mixture (e.g., a dry mixture or a reactor blend) of PE, such as a mixture of two or more polyethylenes ("PE1", "PE2", "PE3", "PE4", etc., as described below). For example, the PE can include a blend of (i) a first PE (PE1) and/or a second PE (PE2) and (ii) a fourth PE (PE4). Optionally these embodiments can further include a third PE (PE3).

PE1

In an embodiment, the first PE ("PE1") is, e.g., one having an Mw <$1.0 \times 10^6$, e.g., in the range of from about $1.0 \times 10^5$ to about $0.90 \times 10^6$, an MWD ≤50.0, e.g., in the ≤20.0, such as in the range of from about 2.0 to about 20.0, and a terminal unsaturation amount <0.20 per $1.0 \times 10^4$ carbon atoms. Optionally, PE1 has an Mw in the range of from about $4.0 \times 10^5$ to about $6.0 \times 10^5$, and an MWD of from about 3.0 to about 10.0. Optionally, PE1 has an amount of terminal unsaturation ≤0.14 per $1.0 \times 10^4$ carbon atoms, or ≤0.12 per $1.0 \times 10^4$ carbon atoms, e.g., in the range of about 0.05 to about 0.14 per $1.0 \times 10^4$ carbon atoms (e.g., below the detection limit of the measurement). PE1 can be, e.g., SUNFINE® SH-800 or SH-810 high density PE, available from Asahi Kasei Chemicals Corporation. Increasing PE1 content in the membrane generally leads to increased membrane strength.

PE2

In an embodiment, the second PE ("PE2") can be, e.g., PE having an Mw <$1.0 \times 10^6$, e.g., in the range of from about $2.0 \times 10^5$ to about $0.9 \times 10^6$, an MWD ≤50.0, e.g., in the range of from about 2.0 to about 20.0, and a terminal unsaturation amount ≥0.20 per $1.0 \times 10^4$ carbon atoms. Optionally, PE2 has an amount of terminal unsaturation ≥0.30 per $1.0 \times 10^4$ carbon atoms, or ≥0.50 per $1.0 \times 10^4$ carbon atoms, e.g., in the range of about 0.6 per $1.0 \times 10^4$ carbon atoms to about 10.0 per $1.0 \times 10^4$ carbon atoms. A non-limiting example of PE2 is one having an Mw in the range of from about $3.0 \times 10^5$ to about $8.0 \times 10^5$, for example about $7.5 \times 10^5$, and an MWD of from about 4 to about 15. PE2 can be, e.g., Lupolen®, available from Basell. Increasing PE2 content in the membrane generally decreases membrane shutdown temperature.

PE1 and/or PE2 can be, e.g., an ethylene homopolymer or an ethylene/α-olefin copolymer containing ≤5.0 mole % of one or more comonomer such as α-olefin, based on 100% by mole of the copolymer. Optionally, the α-olefin is one or more of propylene, butene-1, pentene-1, hexene-1, 4-methylpentene-1, octene-1, vinyl acetate, methyl methacrylate, or styrene. Such a PE can have a melting point ≥132° C. PE1 can be produced, e.g., in a process using a Ziegler-Natta or single-site polymerization catalyst, but this is not required. The amount of terminal unsaturation can be measured in accordance with the procedures described in PCT Patent Publication No. WO 97/23554, for example. PE2 can be produced using a chromium-containing catalyst, for example.

PE3

In an embodiment, PE3 can be, e.g., PE having a Tm ≤130.0° C. Using PE3 having a Tm ≤130.0° C. can provide the finished membrane with a desirably low shutdown temperature, e.g., a shutdown temperature ≤130.5° C.

Optionally, PE3 has a Tm ≥85.0° C., e.g., in the range of from 105.0° C. to 130.0° C., such as 115.0° C. to 126.0° C. Optionally, the PE3 has an Mw ≤$5.0 \times 10^5$, e.g., in the range of from $1.0 \times 10^3$ to $4.0 \times 10^5$, such as in the range of from $1.5 \times 10^3$ to about $3.0 \times 10^5$. Optionally, the PE3 has an MWD in the range of from about 2.0 to about 5.0, e.g., about 1.8 to about 3.5. Optionally, PE3 has a mass density in the range of 0.905 g/cm$^3$ to 0.935 g/cm$^3$. Polyethylene mass density is determined in accordance with ASTM D1505.

In an embodiment, PE3 is a copolymer of ethylene and ≤5.0 mol. % of a comonomer such as one or more of propylene, butene-1, pentene-1, hexene-1, 4-methylpentene-1, octene-1, vinyl acetate, methyl methacrylate, styrene, or other monomer. Optionally, the comonomer amount is in the range of 1.0 mol. % to 5.0 mol. %. In an embodiment, the comonomer is hexene-1 and/or octene-1.

PE3 can be produced in any convenient process, such as those using a Ziegler-Natta or single-site polymerization catalyst. Optionally, PE3 is one or more of a low density polyethylene ("LDPE"), a medium density polyethylene, a branched LDPE, or a linear low density polyethylene, such as a polyethylene produced by metallocene catalyst. PE3 can be produced according to the methods disclosed in U.S. Pat. No. 5,084,534 (such as the methods disclosed therein in examples 27 and 41), which is incorporated by reference herein in its entirety.

PE4

In an embodiment, the fourth PE ("PE4") can be, e.g., one having an Mw ≥$1.0 \times 10^6$, e.g., in the range of from about $1.0 \times 10^6$ to about $5.0 \times 10^6$ and an MWD ≤50.0, e.g., ≤20.0, such as in the range of from about 1.2 to about 50.0. A non-limiting example of PE4 is one having an Mw of from about $1.0 \times 10^6$ to about $3.0 \times 10^6$, for example about $2.0 \times 10^6$, and an MWD of from about 2.0 to about 20.0, preferably about 4.0 to about 15.0. PE4 can be, e.g., an ethylene homopolymer or an ethylene/α-olefin copolymer containing ≤5.0 mole % of one or more comonomers such as α-olefin, based on 100% by mole of the copolymer. The comonomer can be, for example, one or more of, propylene, butene-1, pentene-1, hexene-1, 4-methylpentene-1, octene-1, vinyl acetate, methyl methacrylate, or styrene. Such a polymer or copolymer can be produced using a Ziegler-Natta or a single-site catalyst, though this is not required. Such a PE can have a melting point ≥134° C. PE4 can be ultra-high molecular weight polyethylene ("UHMWPE"), e.g., HI-ZEX MILLION® 240-m polyethylene, available from Mitsui Chemicals, Inc.

The melting points of PE1-PE4 can be determined using the methods disclosed in PCT Patent Publication No. WO 2008/140835, for example.

Polypropylene

In an embodiment, the polypropylene ("PP") can be, e.g., PP having an Mw ≥$6.0 \times 10^5$, such as ≥$7.5 \times 10^5$, for example in the range of from about $0.80 \times 10^6$ to about $3.0 \times 10^6$, such as in the range of about $0.90 \times 10^6$ to about $2.0 \times 10^6$. Optionally, the PP has a Tm ≥160.0° C. and a heat of fusion ("ΔHm") ≥90.0 J/g, e.g., ≥100.0 J/g, such as in the range of from about 110.0 J/g to about 120.0 J/g. Optionally, the PP has an MWD ≤20.0, e.g., in the range of from about 1.5 to about 15.0, such as in the range of from about 2.0 to about 8.5 or in the range of from about 2.5 to about 6.0. Optionally, the PP is a copolymer (random or block) of propylene and ≤5.0 mol. % of a comonomer, the comonomer being, e.g., one or more α-olefins such as ethylene, butene-1, pentene-1, hexene-1, 4-methylpentene-1, octene-1, vinyl acetate, methyl methacrylate, and styrene, etc.; or diolefins such as butadiene, 1,5-hexadiene, 1,7-octadiene, 1,9-decadiene, etc.

In an embodiment, the PP is isotactic polypropylene. The term "isotactic polypropylene" means PP having a meso pentad fraction ≥ about 50.0 mol. % mmmm pentads, optionally ≥ about 94.0 mol. % mmmm pentads, or preferably ≥96.0 mol. % mmmm pentads (based on the total number of moles of isotactic PP). In an embodiment, the PP has (a) a meso pentad fraction ≥ about 90.0 mol. % mmmm pentads, preferably ≥ 94.0 mol. % mmmm pentads; and (b) has an amount of stereo defects ≤ about 50.0 per $1.0 \times 10^4$ carbon atoms, e.g., ≤about 20 per $1.0 \times 10^4$ carbon atoms, or ≤ about 10.0 per $1.0 \times 10^4$ carbon atoms, such as about 5.0 per $1.0 \times 10^4$ carbon atoms. Optionally, the PP has one or more of the following properties: (i) a Tm ≥162.0° C.; (ii) an elongational viscosity ≥about $5.0 \times 10^4$ Pa sec at a temperature of 230° C. and a strain rate of 25 $\sec^{-1}$; (iii) a Trouton's ratio ≥about 15 when measured at a temperature of about 230° C. and a strain rate of 25 $\sec^{-1}$; (iv) a Melt Flow Rate ("MFR"; ASTM D-1238-95 Condition L at 230° C. and 2.16 kg) ≤ about 0.1 dg/min, optionally ≤ about 0.01 dg/min (i.e., a value is low enough that the MFR is essentially not measurable); or (v) an amount extractable species (extractable by contacting the PP with boiling xylene) ≤ 0.5 wt %, e.g., ≤ 0.2 wt %, such as 0.1 wt % or less based on the weight of the PP.

In an embodiment, the PP is an isotactic PP having an Mw in the range of from about $0.8 \times 10^6$ to about $3.0 \times 10^6$, optionally $0.9 \times 10^6$ to about $2.0 \times 10^6$; an MWD ≤9.0, e.g., in the range of from about 2.0 to about 8.5, optionally about 2.0 to about 6.0; and a ΔHm ≥90.0 J/g. Generally, such a PP has a meso pentad fraction ≥94.0 mol. % mmmm pentads, an amount of stereo defects ≤ about 5.0 per $1.0 \times 10^4$ carbon atoms, and a Tm ≥162.0° C.

A non-limiting example of the PP, and methods for determining the PP's Tm, meso pentad fraction, tacticity, intrinsic viscosity, Trouton's ratio, stereo defects, and amount of extractable species are described in PCT Patent Publication No. WO2008/140835, which is incorporated by reference herein in its entirety.

The PP's ΔHm, is determined by the methods disclosed in PCT Patent Publication No. WO2007/132942, which is incorporated by reference herein in its entirety. Tm can be determined from differential scanning calorimetric (DSC) data obtained using a Perkin Elmer Instrument, model Pyris 1 DSC. Samples weighing approximately 5.5-6.5 mg are sealed in aluminum sample pans. Starting at a temperature 30° C., Tm is measured by heating the sample to 230° C. at a rate of 10° C./minute, called first melt (no data recorded). The sample is kept at 230° C. for 10 minutes before a cooling-heating cycle is applied. The sample is then cooled from 230° C. to 25° C. at a rate of 10° C./minute, called "crystallization", then kept at 25° C. for 10 minutes, and then heated to 230° C. at a rate of 10° C./minute, called ("second melt"). For PMP Tm, a temperature of 270° C. is used instead of 230° C. The thermal events in both crystallization and second melt are recorded. The melting temperature ($T_m$) is the peak temperature of the second melting curve and the crystallization temperature ($T_c$) is the peak temperature of the crystallization peak.

Mw and MWD Determination

Polymer Mw and MWD can be determined using a High Temperature Size Exclusion Chromatograph, or "SEC", (GPC PL 220, Polymer Laboratories), equipped with a differential refractive index detector (DRI). The measurement is made in accordance with the procedure disclosed in "*Macromolecules*, Vol. 34, No. 19, pp. 6812-6820 (2001)." Three PLgel Mixed-B columns (available from Polymer Laboratories) are used for the Mw and MWD determination. For PE, the nominal flow rate is 0.5 $cm^3$/min; the nominal injection volume is 300 μL; and the transfer lines, columns, and the DRI detector are contained in an oven maintained at 145° C. For PP and PMP, the nominal flow rate is 1.0 $cm^3$/min; the nominal injection volume is 300 μL; and the transfer lines, columns, and the DRI detector are contained in an oven maintained at 160° C.

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. The same solvent is used as the SEC eluent. Polymer solutions are prepared by placing dry polymer in a glass container, adding the desired amount of the TCB solvent, and then heating the mixture at 160° C. with continuous agitation for about 2 hours. The concentration of polymer solution is 0.25 to 0.75 mg/ml. Sample solutions are filtered off-line before injecting to GPC with 2 μm filter using a model SP260 Sample Prep Station (available from Polymer Laboratories).

The separation efficiency of the column set is calibrated with a calibration curve generated using seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (logMp vs. retention volume) is generated by recording the retention volume at the peak in the DRI signal for each PS standard and fitting this data set to a 2nd-order polynomial. Samples are analyzed using IGOR Pro, available from Wave Metrics, Inc.

Other Species

Optionally, inorganic species (such as species containing silicon and/or aluminum atoms), and/or heat-resistant polymers such as those described in PCT Publications No. WO 2007/132942 and WO 2008/016174 (both of which are incorporated by reference herein in their entirety) can be present in the first and/or second layer.

When the microporous membrane is produced by extrusion, the final microporous membrane generally comprises the polymer used to produce the extrudate. A small amount of diluent or other species introduced during processing can also be present, generally in amounts less than 1 wt % based on the weight of the membrane.

Layered Structure

Particular embodiments of the invention are directed toward microporous membranes having at least one layer, e.g., a first layer comprising a first polymer blend. For example, in an embodiment, the membrane comprises first and third layers with a second layer situated between the first and third layers.

In an embodiment, (i) the first (and third) polymer blend includes about 45.0 wt. % to about 77.0 wt. % polypropylene, about 1.0 wt. % to about 18.0 wt. % polymethylpentene, and about 5.0 wt. % to about 54.0 wt. % polyethylene, based on the weight of the polymer blend (the first or third polymer blend as the case may be); and (ii) the second polymer blend includes polyolefin such as polyethylene and optionally polymethylpentene and/or polypropylene. Optionally, the thickness of the second layer is ≥ the thickness of the first layer, e.g., ≥ the combined thicknesses of the first and third layers, or even a thickness in the range of 70.0% to 90.0% of the membrane's total thickness. Optionally, the polymers of third polymer blend are selected from the same materials and in the same amount ranges as is the case for the first polymer blend.

For example, in one embodiment the third polymer blend contains substantially the same polymers as are present in the first polymer blend, although the relative amounts of the selected polymers in the third polymer blend may be the same or different than the relative amounts of the polymers present in the first polymer blend. In an embodiment, the first and third polymer blend has substantially the same composition. Optionally, the first and third layers have substantially the same thickness and substantially the same composition.

While the invention will be described in terms of a membrane produced in a wet process and having first, second, and third layers, it is not limited thereto, and the description is not meant to foreclose other embodiments within the broader scope of the invention.

In an embodiment, the membrane comprises first and third layers with a second layer located between the first and third layers. The first layer comprises a first polymer blend, the second layer comprises a second polymer blend, and the third layer comprises a third polymer blend. The first, second, and third polymer blends will now be described in more detail.

First and Third Polymer Blends—Amount of Polyethylene

In one or more embodiments, each of the first and third polymer blends include PE in an amount in the range of about 5.0 wt. % to about 54.0 wt. % based on the weight of the polymer blend. Optionally, the first and third polymer blends include PE in an amount in the range of about 15.0 wt % to about 44.0 wt %, e.g., about 22.0 wt % to about 38.0 wt %, such as about 30.0 wt %, based on the weight of the polymer blend (the first or third polymer blend, as the case may be).

In an embodiment, the PE of the first and third polymer blend comprise ≥about 75.0 wt. % PE1, based on the weight of the PE in the polymer blend. For example, the PE of the polymer blend can comprise ≥about 75.0 wt. % PE1 and ≤ about 25.0 wt. % of a second polyethylene selected from one or more of PE2, PE3, or PE4. Optionally, the PE of the first polymer blend comprises about 80.0 wt. % to about 100.0 wt. % of PE1 and about 0.0 wt. % to about 20.0 wt. % PE4, such as about 90.0 wt. % to about 100.0 wt. % of PE1 and about 0.0 wt. % to about 10.0 wt. % PE4, the weight percents being based on the amount of PE in the polymer blend. In an embodiment, the PE of the polymer blend is about 100.0 wt. % PE1 based on the weight of the PE in the polymer blend.

First and Third Polymer Blends—Amount of Polymethylpentene

In one or more embodiments, the first and third polymer blends each include PMP in an amount in the range of about 1.0 wt. % to about 18.0 wt. %, optionally about 2.0 wt. % to about 15.0 wt. % or about 3.0 wt. % to about 12.0 wt. %, based on the weight of the polymer blend (the first or third polymer blend, as the case may be). Optionally, the polymer blend includes PMP in an amount in the range of about 3.0 wt. % to about 6.0 wt. %, based on the weight of the polymer blend, such as about 5.0 wt. %, which improves electrochemical stability. Alternatively, the polymer blend includes PMP in an amount in the range of about 6.0 wt. % to about 12.0 wt. %, based on the weight of the polymer blend e.g., in the range of about 8.0 wt. % to about 12.0 wt. %. In this range, the membrane has further improved electrochemical stability, although an appearance of the membrane is inferior than the above range.

First and Third Polymer Blends—Amount of Polypropylene

In one or more embodiments, the first and third polymer blends each include PP in an amount in the range of about 45.0 wt. % to about 80.0 wt. %, based on the weight of the polymer blend (the first or third polymer blend, as the case may be). Optionally, the first polymer blend includes PP in an amount in the range of about 55.0 wt. % to about 75.0 wt. %, based on the weight of the polymer blend, e.g., in the range of about 60.0 wt. % to about 70.0 wt. %, such as 65.0 wt. %.

First and Third Polymer Blends—Amount of Polypropylene and Polymethylpentene

In embodiments where the first (or third) polymer blend includes PP and/or PMP, the combined amount of PP and PMP in the polymer blend (expressed as a weight percent based on the weight of the polymer blend) is ≤95.0 wt. %, e.g., ≤85.0 wt. %, such as ≤80.0 wt. %. For example, the combined amount of PMP and PP in the first (or third) polymer blend can be in the range of about 46.0 wt. % to about 95.0 wt. %, e.g., about 56.0 wt. % to about 85.0 wt. %, or about 62.0 wt. % to about 78.0 wt. %.

Second Polymer Blend—Amount of Polyethylene

In an embodiment, the second polymer blend includes PE in an amount 80.0 wt. %, in other embodiments ≥90.0 wt. %, and in other embodiments ≥95.0 wt. %, based on the weight of the second polymer blend. For example, the second polymer blend can include PE in an amount in the range of about 90.0 wt. % to about 100.0 wt. %, e.g., about 95.0 wt. % to about 100.0 wt. %, such as about 100.0 wt. %, the weight percents being based on the weight of the second polymer blend.

In an embodiment, the PE of the second polymer blend comprises ≥about 50.0 wt. % PE1, based on the weight of the PE in the second polymer blend. For example, the PE of the second polymer blend can comprise ≥about 65.0 wt. % PE1 and ≤35.0 wt. % of a second polyethylene selected from one or more of PE2, PE3, or PE4. Optionally, the PE of the second polymer blend comprises about 55.0 wt. % to about 75.0 wt. % of PE1 and about 25.0 wt. % to about 45.0 wt. % of PE4, such as about 60.0 wt. % to about 70.0 wt. % of PE1 and about 30.0 wt. % to about 40.0 wt. % of PE4, the weight percents being based on the amount of PE in the second polymer blend.

Second Polymer Blend—Amount of Polymethylpentene

Optionally, the second polymer blend includes PMP. In an embodiment, the second polymer blend includes ≤20.0 wt. % of PMP based on the weight of the second polymer blend, e.g., ≤10.0 wt. %, such as ≤5.0 wt. %. For example, the second polymer blend can contain PMP in an amount in the range of about 0.0 wt. % to about 20.0 wt. %, e.g., about 0.0 wt. % to about 10.0 wt. %, such as about 0.0 wt. % to about 5.0 wt. % PMP based upon the weight of the second polymer blend. In an embodiment, the second layer is substantially free of PMP Second Polymer Blend—Amount of Polypropylene Optionally, the second polymer blend includes PP. In an embodiment, the second polymer blend includes ≤20.0 wt. % of PP based on the weight of the second polymer blend, e.g., ≤10.0 wt. %, such as ≤5.0 wt. %. For example, the second polymer blend can contain PP in an amount in the range of about 0.0 wt. % to about 20.0 wt. %, e.g., about 0.0 wt. % to about 10.0 wt. %, such as about 0.0 wt. % to about 5.0 wt. % of PP based upon the weight of the second polymer blend. In an embodiment, the second layer is substantially free of PP.

Second Polymer Blend—Amount of Polypropylene and Polymethylpentene

In embodiments where the second polymer blend includes PP and/or PMP, the combined amount of PP and PMP in the second polymer blend (expressed as a weight percent based on the weight of the second polymer blend) is ≤20.0 wt. %, e.g., ≤10.0 wt. %, such as ≤5.0 wt. %.

Particular Embodiments

The following membrane embodiment is representative, but the invention is not limited thereto. In a first embodiment, the membrane is a multi-layer microporous membrane comprising three layers, the first and third layers being skin layers and the second layer being a core layer. The membranes of this first embodiment have a thickness ≤50.0/μm, e.g., in the range of 1.0 μm to 25.0 μm; with the core layer having a thickness in the range of 70.0% to 90.0% of the membrane's total thickness. The thickness of the first and third layers can be each in the range of 5.0% to 15.0% of the membrane's total thickness. The membranes of this first embodiment have a meltdown temperature ≥170.0° C., a normalized puncture strength ≥100.0 mN/μm, a normalized air permeability ≤50.0 seconds/100 cm$^2$/μm, e.g., ≤40.0 seconds/100 cm$^2$/μm; and an electrochemical stability ≤55.0 mAh, e.g., ≤45.0 mAh, such as ≤35.0 mAh, or ≤25.0 mAh.

In this first embodiment, the first layer and third layers have substantially equal thickness and composition. In other words, the third polymer blend is substantially the same composition as the first polymer blend. The first polymer blend comprises PE in an amount A1 in the range of 17.5 wt. % to 42.5 wt. %, PP in an amount A2 in the range of 55.0 wt. % to 75.0 wt. %, and PMP in an amount A3 in the range of 2.5 wt. % to 7.5 wt. %, with the weight percents being based on the weight of the first polymer blend. Optionally, A1 is in the range of 24.0 wt. % to 37.0 wt. %, A2 is in the range of 60.0 wt. % to 70.0 wt. %, and A3 is in the range of 3.0 wt. % to 6.0 wt. %. The PE in the first polymer blend comprises 80.0 wt. % to 100.0 wt. % of PE1 and 0.0 wt % to 20.0 wt % of PE4 based on the weight of the PE in the first polymer blend, with (i) the PE1 having an Mw in the range of from about $1.0 \times 10^5$ to about $0.90 \times 10^6$, an MWD in the range of from about 3.0 to about 10.0, and a terminal unsaturation amount <0.20 per $1.0 \times 10^4$ carbon atoms; (ii) the PE4 having an Mw in the range of from about $1.0 \times 10^6$ to about $5.0 \times 10^6$ and an MWD in the range of from about 4.0 to about 15.0; (iii) the PMP having a Tm in the range of from about 220.0° C. to about 240.0° C. and an MFR in the range of from about 0.1.0 dg/min to about 40.0 dg/min; (iv) and the PP being an isotactic PP having an Mw in the range of from about $0.8 \times 10^6$ to about $2.0 \times 10^6$, a Tm ≥160.0° C., a heat of fusion ("ΔHm")≥90.0 J/g, and an MWD in the range of from about 2.5 to about 9.5. Optionally, the PE in the first polymer blend comprises 90.0 wt. % to 100.0 wt. % of PE1 and 0.0 wt. % to 10.0 wt. % of PE4, based on the weight of the PE in the first polymer blend. In this first embodiment, the second polymer blend comprises 90.0 wt. % to 100.0 wt. % of PE, 0.0 wt. % to 10.0 wt. % of PP, and 0.0 to 10.0 wt. % of PMP, based on the weight of the second polymer blend, with the combined amount of PP and PMP being ≤10.0 wt. %. Optionally, the second polymer blend comprises 95.0 wt. % to 100.0 wt. % of PE, 0.0 wt. % to 5.0 wt. % of PP, and 0.0 to 5.0 wt. % of PMP, with the combined amount of PP and PMP being ≤5.0 wt. % based on the weight of the second polymer blend. In this first embodiment, the PE of the second polymer blend comprises PE1 in an amount in the range of 55.0 wt. % to 75.0 wt. % and PE4 in an amount in the range of 25.0 wt. % to 45.0 wt. %, based on the weight of the PE in the second polymer blend. Optionally, the PE of the second polymer blend comprises 60.0 wt. % to 70.0 wt. % of PE1 and 30.0 wt. % to 40.0 wt. % of PE4. Optionally, the PE1, the PE4, the PP (when used), and the PMP (when used) of the second polymer blend are substantially the same as those of the first polymer blend.

In a second embodiment, the membrane is microporous and comprises at least one layer comprising a polymer blend. The membrane can be a monolayer membrane, for example. Additional layers and coatings can be added if desired, e.g., to provide a low shutdown functionality, higher meltdown temperature functionality, etc. The membranes of this first embodiment have a thickness in the range of 1.0 μm to 30.0 μm, e.g., in the range of in the range of 2.5 μm to 25.0 μm; a meltdown temperature ≥175.0° C.; a normalized puncture strength ≥100.0 mN/μm; a normalized air permeability ≤50.0 seconds/100 cm$^2$/μm; and an electrochemical stability ≤55.0 mAh.

The polymer blend of this second embodiment comprises PE in an amount A1 in the range of 15.0 wt. % to 44.0 wt. %, PP in an amount A2 in the range of 54.0 wt. % to 70.0 wt. %, and PMP in an amount A3 in the range of 2.0 wt % to 15.0 wt. %, with the weight percents being based on the weight of the polymer blend. Optionally, A1 is in the range of 24.0 wt. % to 37.0 wt. %, A2 is in the range of 60.0 wt. % to 70.0 wt. %, and A3 is in the range of 3.0 wt. % to 6.0 wt. %. The PE of the polymer blend comprises 80.0 wt. % to 100.0 wt. % PE1 and 0.0 wt % to 2.0 wt % PE4 based on the weight of the PE in the polymer blend. Optionally, the PE in the polymer blend comprises 90.0 wt. % to 100.0 wt. % PE1 and 0.0 wt. % to 10.0 wt. % PE4, based on the weight of the PE in the first polymer blend. The PMP, PP, PE1, and PE4 can be the same as those described in connection with the first embodiment.

Methods for Producing the Membrane

The production of the microporous membrane is described in terms of a multilayer membrane produced using the wet process, though the invention is not limited thereto, and this description is not meant to foreclose other embodiments within the broader scope of the invention.

In an embodiment, the microporous membrane has at least three layers. For example, the membrane can be a three-layer membrane having first and third layers with each comprising a first polymer blend and a second layer comprising a second polymer blend, the second layer being located between and in layer-to-layer contact with the first and third layers.

The process for producing the membrane involves removing diluent from a multi-layer extrudate. The first and third layers of the extrudate each comprise the first polymer blend and at least a first diluent and the second layer of the extrudate comprises the second polymer blend and at least a second diluent. The first and third layers can be outer layers of the extrudate, also called skin layers. Those skilled in the art will appreciate that the third layer of the extrudate could be produced from a different polymer blend, e.g., a third polymer blend, and could have a different thickness than the first layer. After extrusion, at least a portion of the first and second diluents are removed from the extrudate. The process can further comprise stretching the extrudate in MD and/or TD. The stretching can be conducted before and/or after diluent removal. An embodiment for producing a three-layer membrane will now be described in more detail.

The First Mixture

A first mixture is produced by combining the polymers of the first polymer blend (which has optionally been dry-mixed or melt-blended, or is, e.g., in the form of a reactor blend) and a first diluent. The first diluent (which can be a combination of diluents) can be, e.g., a solvent for one or more of the polymers of the first polymer blend. The first mixture can optionally contain additives such as one or more antioxidants. In an embodiment, the amount of such additives does not exceed 1.0 wt % based on the weight of the mixture of polymer and diluent.

The diluent can comprise species capable of forming a single phase in conjunction with the first polymer blend at the extrusion temperature. For example, the first diluent can be a solvent for the polymers of the first polymer blend. Representative diluents include aliphatic or cyclic hydrocarbon such as nonane, decane, decalin and paraffin oil; and phthalic acid ester such as dibutyl phthalate and dioctyl phthalate. Paraffin oil with kinetic viscosity of 20-200 cSt at 40° C. can be used. The choice of first diluent, mixing condition, extrusion condition, etc. can be the same as those disclosed in PCT Patent Publication No. WO 2008/016174, for example, which is incorporated by reference herein in its entirety.

The amount of first diluent in the first mixture is not critical. In an embodiment, the amount of first diluent is in the range of about 50 wt % to about 85 wt %, e.g., 60 wt % to 80 wt %, based on the combined weight of the first mixture. The temperature to which the first mixture is exposed during mixing should be sufficiently high to produce a single-phase mixture for extrusion, e.g., a temperature ≥210.0° C., e.g., ≥220.0° C., such as ≥230.0° C. or even ≥240.0° C., but not exceeding the temperature at which the diluent or polymer would experience significant molecular weight degradation, for example. In an embodiment, the first mixture comprises the first diluent, polymethylpentene, and polypropylene, wherein the first mixture contains 1.0 wt. % to 15.0 wt. % of the polymethylpentene and 45.0 wt. % to 80.0 wt. % of the polypropylene based on the total weight of polymer in the first mixture. Optionally, (i) the polypropylene in the first mixture is an isotactic polypropylene having an Mw ≥6.0×10$^5$ and a Tm ≥160.0° C. and (ii) the polymethylpentene in the first mixture has an MFR in the range of from 0.1 to 28.0 and a Tm in the range of 223.0° C. to 235.0° C. Optionally, the first mixture further comprises 5.0 wt. % to 54.0 wt. % polyethylene, based on the total weight of polymer in the first mixture.

The Second Mixture

The second mixture is produced by combining a second diluent with the polymers of the second polymer blend. The second mixture can be produced by the same methods used to produce the first mixture, but does not have substantially the same composition as the first (or third) mixture. The second diluent can be selected from among the same diluents as the first diluent. And while the second diluent can be (and generally is) selected independently of the first diluent, the diluent can be the same as the first diluent, and can be used in the same relative concentration as the first diluent is used in the first mixture. The temperature to which the second mixture is exposed during mixing should be sufficiently high to produce a single-phase mixture for extrusion, e.g., a temperature ≥210.0° C., e.g., ≥220.0° C., such as ≥230.0° C. or even ≥240.0° C., but not exceeding the temperature at which the diluent or polymer would experience, significant molecular weight degradation, for example. In an embodiment, the second mixture comprises the second diluent and polyolefin. Optionally, the polyolefin in the second mixture comprises ≥80.0 wt. % polyethylene, based on the total weight of polymer in the second mixture. For example, the polyolefin in the second mixture can be a blend of 25.0 wt. % to 45.0 wt. % of PE4 and 55.0 wt. % to 75.0 wt. % of PE1, based on the total weight of polymer in the second mixture.

Extrusion

In an embodiment, the first mixture is conducted from a first extruder to first and third dies and the second mixture is conducted from a second extruder to a second die. A layered extrudate in sheet form (i.e., a body significantly larger in the planar directions than in the thickness direction) can be extruded from the first, second, and third dies to produce a multi-layer extrudate having a first skin layer comprising the first mixture, a second skin layer comprising a third mixture, and a core layer comprising the second mixture, wherein the third mixture can be substantially the same as the first mixture.

The choice of die or dies and extrusion conditions can be the same as those disclosed in PCT Patent Publication No. WO 2008/016174, for example. The temperature to which the first and second mixtures are exposed within the die should be sufficiently high so as to maintain each of the first and second mixtures as a single phases (e.g., in the molten state) during extrusion at a temperature, e.g., of ≥210.0° C., ≥220.0° C., such as ≥230.0° C. or even ≥240.0° C., but not exceeding the temperature at which the diluent or polymer would experience significant molecular weight degradation, for example. Matching the viscosities of the first and second mixture is believed to be beneficial for lessening the amount of thickness variation in the finished membrane.

Extrudate Cooling (Optional)

Following extrusion, the extrudate is optionally exposed to a temperature in the range of 15° C. to 50° C. to form a cooled extrudate. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Patent Publication No. WO 2008/01617, for example. In an embodiment, the cooled extrudate has a thickness ≤10 mm, e.g., in the range of 0.1 mm to 10 mm, or 0.5 mm to 5 mm. Generally, the second layer of the cooled extrudate has a thickness that is ≤50% of the cooled extrudate's total thickness; and the first and third layers of the cooled extrudate optionally having substantially the same thickness.

Stretching the Extrudate (Upstream Stretching)

The extrudate or cooled extrudate can be stretched in at least one direction (called "upstream stretching" or "wet stretching"), e.g., in a planar direction such as MD or TD. It is believed that such stretching results in at least some orientation of the polymer in the extrudate. This orientation is referred to as "upstream" orientation. The extrudate can be stretched by, for example, a tenter method, a roll method, an inflation method or a combination thereof, as described in PCT Patent Publication No. WO 2008/016174, for example. The stretching may be conducted monoaxially or biaxially; in certain embodiments, the extrudate is biaxially stretched. In the case of biaxial stretching, any of simultaneous biaxial stretching, sequential stretching or multi-stage stretching (for instance, a combination of the simultaneous biaxial stretching and the sequential stretching) can be used; in certain embodiments, the extrudate is simultaneously biaxially stretched. When biaxial stretching is used, the magnification factor need not be the same in each stretching direction.

Optionally, the extrudate is stretched simultaneously in TD and MD to a magnification factor in the range of 4 to 6. Suitable stretching methods are described in PCT Patent Publication No. WO 2008/016174, for example. The MD and TD magnifications can be substantially the same, but this is not required. In an embodiment, the stretching magnification is equal to 5 in MD and TD. The magnification factor operates multiplicatively on film size. For example, a film having an initial width (TD) of 2.0 cm that is stretched in TD to a magnification factor of 4 fold will have a final width of 8.0 cm.

Although it is not required, the stretching can be conducted while exposing the extrudate to a temperature in the range of from about Tcd to Tm (the "stretching temperature"), where Tcd and Tm are defined as the crystal dispersion temperature and melting point of the PE having the lowest melting point among the polyethylenes used to produce the extrudate. The crystal dispersion temperature is determined by measuring the temperature characteristics of dynamic viscoelasticity according to ASTM D 4065. In an embodiment where Tcd is in the range of about 90° C. to about 100° C., the stretching temperature can be from about 90° C. to about 125° C.;

preferably from about 100° C. to about 125° C., more preferably from 105° C. to 125° C.

Optionally, the stretched extrudate can undergo a thermal treatment before diluent removal. In the thermal treatment, the stretched extrudate is exposed to a temperature that is higher (warmer) than the temperature to which the extrudate is exposed during stretching. The planar dimensions of the stretched extrudate (length in MD and width in TD) can be held constant while the stretched extrudate is exposed to the higher temperature. Since the extrudate contains polymer and diluent, its length and width are referred to as the "wet" length and "wet" width. In an embodiment, the stretched extrudate is exposed to a temperature in the range of 110° C. to 125° C. for a time in the range of 1 second to 100 seconds while the wet length and wet width are held constant, e.g., by using tenter clips to hold the stretched extrudate along its perimeter. In other words, during the thermal treatment, there is no magnification or demagnification (i.e., no dimensional change) of the stretched extrudate in MD or TD.

In this step and in other steps such as downstream stretching and heat setting where the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infrared heating in an oven, etc. can be used with or instead of heated air.

Diluent Removal

In an embodiment, at least a portion of the first and second diluents are removed (or displaced) from the extrudate to form a membrane. A displacing (or "washing") solvent can be used to remove (wash away or displace) the first and second diluents. Process conditions for removing first and second diluents can be the same as those disclosed in PCT Patent Publication No. WO 2008/016174, for example. The term "dried membrane" refers to an extrudate from which at least a portion of the diluent has been removed. It is not necessary to remove all diluent from the extrudate, although it can be desirable to do so since removing diluent increases the porosity of the final membrane.

In an embodiment, at least a portion of any remaining volatile species, such as washing solvent, can be removed from the dried membrane at any time after diluent removal. Any method capable of removing the washing solvent can be used, including conventional methods such as heat-drying, wind-drying (moving air), etc. Process conditions for removing volatile species, such as washing solvent, can be the same as those disclosed in PCT Patent Publications No. WO 2008/016174 and WO 2007/132942, for example.

Stretching the Membrane (Downstream Stretching)

The dried membrane can be stretched (called "downstream stretching" or "dry stretching" since at least a portion of the diluent has been removed or displaced) in at least one direction, e.g., MD and/or TD. It is believed that such stretching results in at least some orientation of the polymer in the membrane. This orientation is referred to as downstream orientation. Before downstream stretching, the dried membrane has an initial size in MD (a first dry length) and an initial size in TD (a first dry width). As used herein, the term "first dry width" refers to the size of the dried membrane in TD prior to the start of dry stretching. The term "first dry length" refers to the size of the dried membrane in MD prior to the start of dry stretching. Tenter stretching equipment of the kind described in WO 2008/016174 can be used, for example.

The downstream stretching can be conducted in MD, TD, or both directions. The membrane can be stretched in MD from the first dry length to a second dry length that is larger than the first dry length by a magnification factor (the "MD dry stretching magnification factor") in the range of from about 1.1 to about 1.5. When TD dry stretching is used, the dried membrane can be stretched in TD from the first dry width to a second dry width that is larger than the first dry width by a magnification factor (the "TD dry stretching magnification factor"). The TD dry stretching magnification factor can be in the range of from about 1.1 to about 1.6. When the stretching is conducted in both MD and TD, it can be sequential or simultaneous. Since TD heat shrinkage generally has a greater effect on battery properties than does MD heat shrinkage, the amount of TD dry magnification generally does not exceed the amount of MD dry magnification. When biaxial dry stretching is used, the dry stretching can be simultaneous in MD and TD or sequential. When the dry stretching is sequential, generally MD stretching is conducted first followed by TD stretching.

The downstream orientation is generally conducted while exposing the dried membrane to a temperature $\leq$Tm, e.g., in the range of from about Tcd-30° C. to Tm. In an embodiment, the stretching temperature is generally conducted with the membrane exposed to a temperature in the range of from about 70° C. to about 135° C., for example from about 120° C. to about 132° C., or from about 122° C. to about 130° C.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second. Though not critical, the upper limit of the stretching rate is preferably 50%/second to prevent rupture of the membrane.

Controlled Width Reduction (Optional)

Following downstream stretching, the dried membrane can be subjected to a controlled reduction in width from the second dry width to a third width, the third dry width being in the range of from the first dry width to about 1.4 times larger than the first dry width. The width reduction generally conducted while the membrane is exposed to a temperature $\geq$Tcd-30° C., but less than Tm. For example, the membrane can be exposed to a temperature in the range of from about 70° C. to about 135° C., such as from about 120° C. to about 132° C., or from about 125° C. to about 130° C. In an embodiment, the decreasing of the membrane's width is conducted while the membrane is exposed to a temperature that is lower than Tm. In an embodiment, the third dry width is in the range of from about 1.1 times larger than the first dry width to about 1.4 times larger than the first dry width.

It is believed that exposing the membrane to a temperature during the controlled width reduction that is $\geq$the temperature to which the membrane was exposed during the TD stretching leads to greater resistance to heat shrinkage in the finished membrane.

Heat-Setting (Optional)

Optionally, the membrane is thermally treated (heat-set) one or more times after diluent removal, e.g., after downstream stretching, the controlled width reduction, or both. It is believed that heat-setting stabilizes crystals and makes uniform lamellas in the membrane. In an embodiment, the heat setting is conducted while exposing the membrane to a temperature in the range Tcd to Tm, e.g., a temperature, e.g., in the range of from about 100° C. to about 135° C., such as from about 120° C. to about 132° C., or from about 122° C. to about 130° C. Generally, the heat setting is conducted for a time sufficient to form uniform lamellas in the membrane, e.g., ≤1,000 seconds, such as a time in the range of 1 to 600 seconds. In an embodiment, the heat setting is operated under conventional heat-set "thermal fixation" conditions. The term "thermal fixation" refers to heat-setting carried out while maintaining the length and width of the membrane substantially constant, e.g., by holding the membrane's perimeter using tenter clips during the heat setting.

Optional annealing, heated roller, hot solvent, cross linking, hydrophilizing, and coating treatments can be conducted if desired, e.g., as described in PCT Patent Publication No. WO 2008/016174.

Membrane Structure and Properties

In an embodiment, the membrane is a dimensionally-stable (e.g., resistant to delamination) microporous membrane having at least two layers, where the respective layers have a composition derived from the polymers described above.

The membrane generally comprises the polymer used to produce the extrudate. A small amount of diluent or other species introduced during processing can also be present, generally in amounts ≤1.0 wt % based on the weight of the membrane. A small amount of polymer molecular weight degradation might occur during processing, but this is acceptable. In an embodiment, the Mw of the polymers in the membrane decrease by a factor of ≤10%, for example, or ≤1.0%, or ≤0.1% with respect to the Mw of the polymers used to produce the membrane.

The membrane optionally has one or more of the following properties.

Thickness

In an embodiment, the microporous membrane has a thickness ≤2.0×10$^2$ μm, e.g. ≤50.0 μm. In one or more embodiments, the microporous membrane is a multilayer membrane and includes a first layer having a thickness $T_1$, a second layer having a thickness $T_2$, and a third layer having a thickness $T_3$, with the second layer being located between the first and third layers. Optionally, $T_1$ is substantially the same as $T_3$ and $T_2 \geq T_1$. Optionally, $T_2 \leq T_1 + T_3$.

In an embodiment, $T_1$, $T_2$, and $T_3$ are each ≥1.5 μm, e.g., ≥5.0 μm, such as ≥10.0 μm. For example, in one embodiment (i) $T_1$ is substantially the same as $T_3$, (ii) $T_2$ is in the range of 8.0 μm to 30 μm, (iii) $T_2 \geq T_1$, and (iv) $T_1$ is in the range of 1.5 μm to 10.0 μm.

In an embodiment, the membrane's thickness is generally ≥10.0 μm, e.g., ≥20.0 μm, such as in the range of from about 10.0 μm to about 2.0×10$^2$ μm, e.g., from about 10.0 μm to about 30.0 μm. In an embodiment where the membrane is a three-layer membrane having first and third layers as skin layers and a second layer as a core layer in contact with the skin layers, the membrane can have a total thickness in the range of about 10.0 μm to about 25.0 μm, the thickness of the first and third layers can be each in the range of 5.0% to 15.0% of the membrane's total thickness, and the thickness of the second layer can be in the range of 70.0% to 90.0% of the membrane's total thickness. The membrane's thickness can be measured, e.g., by a contact thickness meter at 1.0 cm longitudinal intervals over the width of 10.0 cm, and then averaged to yield the membrane thickness. Thickness meters such as the Litematic available from Mitsutoyo Corporation are suitable. Non-contact thickness measurement methods are also suitable, e.g., optical thickness measurement methods.

Porosity

The membrane's porosity is measured conventionally by comparing the membrane's actual weight to the weight of an equivalent non-porous membrane of 100% polymer (equivalent in the sense of having the same polymer composition, length, width, and thickness). Porosity is then determined using the formula: Porosity %=100×(w2−w1)/w2, where "w1" is the actual weight of the membrane, and "w2" is the weight of an equivalent non-porous membrane (of the same polymers) having the same size and thickness. Optionally, the membrane's porosity is ≥20.0%, e.g., in the range of 25.0% to 85.0%, such as in the range of 35.0 to 60.0%.

Normalized Air Permeability

In an embodiment, the membrane has a normalized air permeability ≤50.0 seconds/100 cm$^3$/μm (as measured according to JIS P8117), e.g., ≤40.0 seconds/100 cm$^3$/μm, such as ≤20.0 seconds/100 cm$^3$/μm. Since the air permeability value is normalized to the air permeability value of an equivalent membrane having a film thickness of 1.0 μm, the membrane's air permeability value is expressed in units of "seconds/100 cm$^3$/μm". Optionally, the membrane's normalized air permeability is in the range of from about 1.0 seconds/100 cm$^3$/μm to about 50.0 seconds/100 cm$^3$/μm, or from about 5.0 seconds/100 cm$^3$/μm to about 30.0 seconds/100 cm$^3$/μm. Normalized air permeability is measured according to JIS P8117, and the results are normalized to the permeability value of an equivalent membrane having a thickness of 1.0 μm using the equation A=1.0 μm*(X)/$T_1$, where X is the measured air permeability of a membrane having an actual thickness $T_1$ and A is the normalized air permeability of an equivalent membrane having a thickness of 1.0 μm.

Normalized Pin Puncture Strength

The membrane's pin puncture strength is expressed as the pin puncture strength of an equivalent membrane having a thickness of 1.0 μm [mN/μm]. Pin puncture strength is defined as the maximum load measured at 23° C. when the membrane having a thickness of $T_1$ is pricked with a needle of 1 mm in diameter with a spherical end surface (radius R of curvature: 0.5 mm) at a speed of 2 mm/second. The pin puncture strength ("S") is normalized to the pin puncture strength value of an equivalent membrane having a thickness of 1.0 μm using the equation S=[1.0 μm*($S_1$)]/($T_1$), where $S_1$ is a pin puncture strength "as measured" and $T_1$ is the average thickness of the membrane. In an embodiment, the membrane's normalized pin puncture strength is ≥1.0×10$^2$ mN/μm, e.g., ≥1.2×10$^2$ mN/μm, such as 1.4×10$^2$ mN/μm. In an embodiment, the membrane has a normalized pin puncture strength in the range of about 1.0×10$^2$ mN/μm to about 2.5×10$^2$ mN/μm.

Meltdown Temperature (as Measured by Membrane Rupture)

Meltdown temperature is measured as follows. A sample of the microporous membrane measuring 5 cm×5 cm is fastened along its perimeter by sandwiching the sample between metallic blocks each having a circular opening of 12 mm in diameter. The blocks are then positioned so the plane of the membrane is horizontal. A tungsten carbide ball of 10 mm in diameter is placed on the microporous membrane in the circular opening of the upper block. Starting at 30° C., the membrane is then exposed to an increasing temperature at a rate of 5° C./minute. The membrane's meltdown temperature is defined as the temperature at which the ball completely penetrates the sample, i.e., the temperature at which the sample breaks. In an embodiment, the membrane can have a meltdown temperature ≥170.0° C., e.g., ≥180.0° C., such as ≥200.0° C. In an embodiment, the membrane has a meltdown temperature in the range of about 175.0° C. to about 210.0° C., e.g., in the range of from 180.0° C. to 205.0° C.

Electrochemical Stability electrochemical stability is a membrane property related to the membrane's resistance to oxidation when the membrane is used as a BSF in a battery exposed to relatively high-temperature storage or use electrochemical stability has the units of mAh, and a lower value, representing less integrated charge loss during high-temperature storage or overcharging, is generally desired. For automotive batteries, such as those used for starting or powering motor means for moving an electric vehicle or hybrid electric vehicle, and for power tool batteries, an electrochemical stability ≤50.0 mAh is desired since those relatively high-power, high capacity applications are particularly sensitive to any loss in battery capacity, such as self-discharge losses resulting from electrochemical instability of the BSF. The term "high-capacity" batteries generally means batteries capable of supplying 1 Ampere hour (1 Ah) or more, e.g., 2.0 Ah to 3.6 Ah. Optionally, the membrane has an electrochemical stability ≤45.0 mAh, e.g., ≤35.0 mAh, such as ≤25.0 mAh e.g., in the range of 1.0 mAh to 25.0 mAh.

To measure electrochemical stability, a membrane having a length (MD) of 70 mm and a width (TD) of 60 mm is located between an anode and cathode having the same planar dimensions as the membrane. The anode is made of natural graphite and the cathode is made of $LiCoO_2$. An electrolyte is prepared by dissolving $LiPF_6$ into a mixture of ethylene carbonate (EC) and dimethyl carbonate (DMC) (3/7, V/V) as 1 M solution. The electrolyte is impregnated into the membrane in the region between the anode and the cathode to complete the battery.

The battery is then exposed to an applied voltage of 4.3V while exposed to a temperature of 60° C. for 28 days. The term "electrochemical stability" is defined as the integrated current (in mAh) flowing between the voltage source and the battery over the 28 day period. Electrochemical stability is generally measured three times under substantially identical conditions (three substantially identical batteries produced from three substantially identical BSF samples). The numerical average (arithmetic mean), of the three measured electrochemical stability values is the "average electrochemical stability."

Heat Shrinkage at 105° C. in at Least One Planar Direction

The membrane's shrinkage at 105° C. in MD and TD is measured as follows: (i) measure the size of a test piece of microporous membrane at ambient temperature in both the MD and TD, (ii) equilibrate the test piece of the microporous membrane at a temperature of 105.0° C. for 8 hours with no applied load, and then (iii) measure the size of the membrane in both the MD and TD. The heat (or "thermal") shrinkage in MD and TD can be obtained by dividing the result of measurement (i) by the result of measurement and (ii) expressing the resulting quotient as a percent.

Optionally, the membrane has a heat shrinkage at 105° C. in at least one planar direction (e.g., MD or TD) of ≤10.0% e.g., ≤5.0%, such as in the range of from 0.10% to 5.0%, e.g., 0.20% to 1.0%.

TD Heat Shrinkage at 130° C.≤25.0% and TD Heat Shrinkage at 170° C.≤55.0%

In an embodiment, the membrane has a TD heat shrinkage at 130° C.≤25.0%, for example in the range of from about 1.0% to about 25.0%, and/or a TD heat shrinkage at 170° C.≤50.0%, e.g., from about 1.0% to about 50.0%.

The measurement of 130° C. and 170° C. heat shrinkage is slightly different from the measurement of heat shrinkage at 105° C., reflecting the fact that the edges of the membrane parallel to the transverse direction are generally fixed within the battery, with a limited degree of freedom allowed for expansion or contraction (shrinkage) in TD, particularly near the center of the edges parallel to MD. Accordingly, a square sample of microporous film measuring 50 mm along TD and 50 mm along MD is mounted in a frame at 23.0° C., with the edges parallel to TD fixed to the frame (e.g., by tape) leaving a clear aperture of 35 mm in MD and 50 mm in TD. The frame with sample attached is then exposed to a temperature of 130° C. or 170° C. for thirty minutes, and then cooled. TD heat shrinkage generally causes the edges of the film parallel to MD to bow slightly inward (toward the center of the frame's aperture). The shrinkage in TD (expressed as a percent) is equal to the length of the sample in TD before heating divided by the narrowest length (within the frame) of the sample in TD after heating times 100 percent.

The Appearance of the Membrane

The membrane has a white film like appearance. An appearance of membrane is visually observed surface condition (roughness) of the membrane and same level of appearance as polyolefin microporous membrane (E20MMS) produced by Toray Tonen Specialty Separator Godo Kaisha is regarded as "normal".

Battery Separator Film and Battery

The membrane is permeable to liquid (aqueous and non-aqueous) at atmospheric pressure. Thus, the membrane can be used as a battery separator, filtration membrane, etc. The thermoplastic film is particularly useful as a BSF for a secondary battery, such as a nickel-hydrogen battery, nickel-cadmium battery, nickel-zinc battery, silver-zinc battery, lithium-ion battery, lithium-ion polymer battery, etc. In an embodiment, the invention relates to lithium-ion secondary batteries containing BSF comprising the thermoplastic film. Such batteries are described in PCT Patent Publication No. WO 2008/016174, which is incorporated herein by reference in its entirety. Such batteries can be used as a power source, e.g., for electric vehicles and hybrid electric vehicles.

EXAMPLES

Example 1

(1) Preparation of the First Mixture

A first mixture is prepared as follows. First, combine (a) 5.0 wt. % of polymethylpentene (Mitsui Chemicals, Inc. TPX: MX002) having an MFR of 21 dg/min and a Tm of 222° C. (the PMP), (b) 65.0 wt. % of isotactic PP having an Mw of $1.1 \times 10^6$ and a ΔHm of 114 J/g (the PP), and (c) 30.0 wt. % of PE having an Mw of $5.6 \times 10^5$ and a Tm of 134.0° C. (the PE1), the weight percents being based on the weight of the combined polymer.

Next, 25.0 wt. % of the combined polymer is charged into a strong-blending double-screw extruder having an inner diameter of 58 mm and L/D of 42, and 75.0 wt. % liquid paraffin (50 cst at 40° C.) is supplied to the double-screw extruder via a side feeder. Mixing is conducted at 220° C. and 200 rpm to produce the first mixture, the weight percents being based on the weight of the first mixture.

(2) Preparation of Second Mixture

A second mixture is prepared in the same manner as the first except as follows: The combined polymer includes (a) 70.0 wt. % of the PE1 and (b) 18.0 wt. % of PE having an Mw of $1.9 \times 10^6$ and a Tm of 136.0° C. (PE4), the weight percents being based on the weight of the combined polymer. 25.0 wt. % of the combined polymer is charged into the strong-blending double-screw extruder and 75.0 wt. % of the liquid paraffin is supplied to the side feeder. Mixing is conducted at 220° C. and 400 rpm to produce the second mixture.

(3) Production of Membrane

The first and second mixtures are supplied from their respective double-screw extruders to a three-layer-extruding T-die, and extruded therefrom to form a layered extrudate of first mixture/second mixture/first mixture at a layer thickness ratio 12.5/75/12.5. The extrudate is cooled while passing through cooling rollers controlled at 20° C., to form a three-layer gel-like sheet, which is simultaneously biaxially stretched (upstream stretching) at 115° C. to a magnification of 5 fold in both MD and TD by a tenter-stretching machine. The stretched three-layer, gel-like sheet is fixed to an aluminum frame of 20 cm×20 cm, immersed in a bath of methylene chloride controlled at 25° C. to remove the liquid paraffin with vibration of 100 rpm for 3 minutes, and dried by air flow at room temperature. While holding the size of the membrane substantially constant, the membrane is then heat-set at 125° C. for 10 minutes to produce the final microporous membrane. Selected starting materials, process conditions, and membrane properties are set out in the Table.

Examples 2-8

Two microporous membranes were produced as described in Example 1, except as set out in the Table.

Comparative Example 1

Mono layer membrane is produced in the following method.

A mixture is prepared as follows. The combined polymer (a) 98.0 wt. % of PE1 and (b) 2.0 wt. % of PE4 having an Mw of $1.9 \times 10^6$ and a Tm of 136.0° C., the weight percents being based on the weight of the combined polymer. Next, 40.0 wt. % of the combined polymer is charged into a strong-blending double-screw extruder having an inner diameter of 58 mm and L/D of 42, and 60.0 wt. % of the liquid paraffin is supplied to the double-screw extruder via a side feeder. Mixing is conducted at 210° C. and 400 rpm to produce the mixture.

The mixtures are supplied from double-screw extruders to a mono-layer-extruding T-die, and extruded therefrom to form an extrudate. The extrudate is cooled while passing through cooling rollers controlled at 20° C., to form a gel-like sheet, which is simultaneously biaxially stretched (upstream stretching) at 119° C. to a magnification of 5 fold in both MD and TD by a tenter-stretching machine. The stretched gel-like sheet is fixed to an aluminum frame of 20 cm×20 cm, immersed in a bath of methylene chloride controlled at 25° C. to remove the liquid paraffin with vibration of 100 rpm for 3 minutes, and dried by air flow at room temperature. While holding the size of the membrane substantially constant, the membrane is then heat-set at 130° C. for 10 minutes to produce the final microporous membrane. Selected starting materials, process conditions, and membrane properties are set out in the Table.

TABLE 1

| | | Example No. | | | | |
|---|---|---|---|---|---|---|
| | | 1 | 2 | 3 | 4 | 5 |
| Skin Layers | | | | | | |
| PMP | Content (wt. %) | 5.0 | 10.0 | 15.0 | 20.0 | 0.0 |
| PP | Content (wt. %) | 65.0 | 60.0 | 55.0 | 50.0 | 70.0 |
| PE1 | Content (wt. %) | 30.0 | 30.0 | 30.0 | 30.0 | 30.0 |
| Core Layer | | | | | | |
| PE1 | Content (wt. %) | 70.0 | 70.0 | 70.0 | 70.0 | 70.0 |
| PE4 | Content (wt. %) | 30.0 | 30.0 | 30.0 | 30.0 | 30.0 |
| Processing Condition | | | | | | |
| Polymer content (wt. %) polymer-diluent (core/skin) | | 25.0/25.0 | 25.0/25.0 | 25.0/25.0 | 25.0/25.0 | 25.0/25.0 |
| mixture (core/skin) | | 27/73 | 25/75 | 27/63 | 27/63 | 25/75 |
| Extrusion | | | | | | |
| Extrusion Temperature (° C.) | | 220 | 220 | 220 | 220 | 220 |
| Stretching Temperature (° C.) | | 115 | 115 | 115 | 115 | 115 |
| Magnification (MD × TD) | | 5 × 5 | 5 × 5 | 5 × 5 | 5 × 5 | 5 × 5 |
| Heat Set Temperature (° C.) | | 125 | 125 | 125 | 125 | 125 |
| Properties | | | | | | |
| Average Thickness (mm) | | 18.0 | 16.0 | 16.0 | 16.0 | 16.0 |
| Porosity (%) | | 38 | 38 | 36 | 37 | 37 |
| Air Permeability (sec/100 cm3/mm) | | 36.0 | 38.9 | 46.3 | 57.0 | 36.0 |
| Puncture Strength (mN/mm) | | 258.0 | 256.0 | 249.0 | 199.0 | 267.0 |
| TD Heat Shrinkage at 105° C. (%) | | 3.5 | 3.3 | 3.5 | 3.3 | 3.5 |
| TD Heat Shrinkage at 130° C. (%) | | 20.0 | 16.0 | 19.0 | 17.0 | 17.0 |
| TD Heat Shrinkage at 170° C. (%) | | 42.0 | 41.0 | 39.0 | 39.0 | 45.0 |
| Average Electrochemical Stability (mA h) | | 30.1 | 50.6 | 41.3 | 52.4 | 79.4 |
| Meltdown Temperature (° C.) | | 179.0 | 179.0 | 177.0 | 182.0 | 181.0 |
| Appearance | | ○ | ○ | Δ | ▲ | ○ |

| | | Example No. | | | comp. Ex. |
|---|---|---|---|---|---|
| | | 6 | 7 | 8 | 1 |
| Skin Layers | | | | | |
| PMP | Content (wt. %) | 12.0 | 8.0 | 3.0 | — |
| PP | Content (wt. %) | 58.0 | 62.0 | 67.0 | — |
| PE1 | Content (wt. %) | 30.0 | 30.0 | 30.0 | — |

TABLE 1-continued

| Core Layer | | | | |
|---|---|---|---|---|
| PE1 Content (wt. %) | 70.0 | 70.0 | 70.0 | 98.0 |
| PE4 Content (wt. %) | 30.0 | 30.0 | 30.0 | 2.0 |
| Processing Condition | | | | |
| Polymer content (wt. %) polymer-diluent (core/skin) | 25.0/25.0 | 25.0/25.0 | 25.0/25.0 | 40 |
| mixture (core/skin) | 36/64 | 38/62 | 36/64 | 0/100 |
| Extrusion | | | | |
| Extrusion Temperature (° C.) | 220 | 220 | 220 | 210 |
| Stretching Temperature (° C.) | 115 | 115 | 115 | 119 |
| Magnification (MD × TD) | 5 × 5 | 5 × 5 | 5 × 5 | 5 × 5 |
| Heat Set Temperature (° C.) | 125 | 125 | 125 | 130 |
| Properties | | | | |
| Average Thickness (mm) | 17.0 | 19.0 | 21.0 | 20.0 |
| Porosity (%) | 38 | 40 | 42 | 39 |
| Air Permeability (sec/100 cm3/mm) | 54.7 | 45.3 | 32.7 | 12.6 |
| Puncture Strength (mN/mm) | 240.0 | 242.0 | 240.0 | 274.0 |
| TD Heat Shrinkage at 105° C. (%) | 4.0 | 4.5 | 4.6 | 2.5 |
| TD Heat Shrinkage at 130° C. (%) | 21.4 | 21.8 | 23.8 | break |
| TD Heat Shrinkage at 170° C. (%) | 42.0 | 43.6 | 43.5 | break |
| Average Electrochemical Stability (mA h) | 19.6 | 25.3 | 41.2 | 62 |
| Meltdown Temperature (° C.) | 177.0 | 163.0 | 169.0 | 147.0 |
| Appearance | Δ~○ | ○ | ○ | ○ |

Appearance
○: good
Δ: normal
▲: little roughness

Discussion

Examples 1-8 show an improved balance of meltdown temperature, air permeability, and electrochemical stability when the skin layer's polymer blend comprises 45.0 wt. % to 77.0 wt. % polypropylene, 1.0 wt. % to 18.0 wt. % polymethylpentene, and 5.0 wt. % to 54.0 wt. % polyethylene, based on the weight of the polymer blend. Although the membrane of Example 5 has a relatively high meltdown temperature, the absence of PMP in the skin layers leads to worse electrochemical stability. Example 4 shows that pin puncture strength worsens when skin layer PMP content is ≥20.0 wt. %. Although there is some variability in the data, the Examples show that optimum membrane electrochemical stability is achieved when the skin layer PMP amount is in the range of about 3.0 wt. % to about 12.0 wt. %, based on the weight of the skin layer's polymer blend, such as in the range of 2.0 wt. % to 15.0 wt. %. Especially, good balance of electrochemical stability and appearance of the membrane is achieved when the skin layer PMP amount is in the range of 3.0 wt. % to 6.0 wt. %, based on the weight of the skin layer's polymer blend. Although appearance of the membrane tended to have rough a little, the membrane has better electrochemical stability when the skin layer PMP amount is in the range of 6.0 wt. % to 12.0 wt. %.

Membrane electrochemical stability as a function of skin layer PMP content is shown graphically in the FIGURE for the membranes of Examples 1-8. Example 1 is shown as a closed rectangle, Example 2 by an open rectangle, Example 3 by an open triangle, Example 4 by a closed circle, and Example 5 by a closed triangle, Example 6 by a open diamond, Example 7 by a closed diamond and Example 8 by a open circle.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A membrane comprising a layer containing a polymer blend, the polymer blend comprising 45.0 wt. % to 77.0 wt % polypropylene, 1.0 wt % to 18.0 wt. % polymethylpentene, and 5.0 wt. % to 54.0 wt. % polyethylene, based on the weight of the polymer blend, wherein the membrane is microporous and has an electrochemical stability ≤50.0 mAh.

2. The membrane of claim 1, wherein the membrane further comprises a second layer, wherein the second layer is microporous and comprises a second polymer blend.

3. The membrane of claim 1, wherein the membrane has a thickness ≤50.0 μm, a meltdown temperature ≥170.0° C., and a normalized air permeability ≤50.0 seconds/100 cm$^3$/μm.

4. The membrane of claim 1, wherein the polypropylene has an Mw in the range of from $0.90 \times 10^6$ to $2.0 \times 10^6$, an MWD≤20.0, and a ΔHm≥90.0 J/g.

5. The membrane of claim 1, wherein the polymethylpentene has an MFR in the range of from 0.1 dg/min to 28.0 dg/min and a Tm in the range of 223.0° C. to 235.0° C.

6. The membrane of claim 2, wherein the second polymer blend comprises 55.0 wt. % to 75.0 wt % of a first polyethylene and 25.0 wt % to 45.0 wt % of a second polyethylene, based on the weight of the second polymer blend, and wherein the first polyethylene has a an Mw in the range of $1.0\times10^5$ to about $0.90\times10^6$ and an MWD≤20.0 and the second polyethylene has an Mw≥$1.0\times10^6$, an MWD≤20.0, and a Tm≥134° C.

7. The membrane of claim 2, wherein the membrane further comprises a third layer, the third layer having a composition substantially the same as that of the first layer, the second layer being located between the first and third layers.

8. The membrane of claim 7, wherein:
(a) the second layer is in contact with the first layer and the third layer;
(b) the membrane's total thickness is in the range of 10.0 μm to 25.0 μm;
(c) the second layer has a thickness of 70.0% to 90.0% of the membrane's total thickness; and
(d) the thicknesses of the first and third layers are each in the range of 5.0% to 15.0% of the membrane's total thickness.

9. The membrane of claim 1, wherein the membrane has one or more of a porosity ≥20.0%, a normalized pin puncture strength ≥$1.0\times10^2$ mN/μm, and a 105° C. heat shrinkage ≤10.0% in at least one direction.

10. A membrane comprising a first layer containing a first polymer blend and a second layer containing a second polymer blend, wherein the first polymer blend comprising 45.0 wt. % is to 77.0 wt. % polypropylene, 1.0 wt. % to 18.0 wt. % polymethylpentene, and 5.0 wt. % to 54.0 wt. % polyethylene, based on the weight of the polymer blend, the polypropylene has an Mw in the range of from $0.90\times10^6$ to $2.0\times10^6$, an MWD≤20.0, and a ΔHm≥90.0 J/g and the polymethylpentene has an MFR in the range of from 0.1 dg/min to 28.0 dg/min and a Tm in the range of 223.0° C. to 235.0° C., wherein the second polymer blend comprises 55.0 wt. % to 75.0 wt. % of a first polyethylene and 25.0 wt. % to 45.0 wt. % of a second polyethylene, based on the weight of the second polymer blend, and wherein the first polyethylene has a an Mw in the range of $1.0\times10^5$ to about $0.90\times10^6$ and an MWD≤20.0 and the second polyethylene has an Mw≥$1.0\times10^6$, an MWD≤20.0, and a Tm≥134° C., wherein the membrane is microporous and has an electrochemical stability ≤50.0 mAh, one or more of a porosity ≥20.0%, a normalized pin puncture strength ≥$1.0\times10^2$ mN/μm, and a 105° C. heat shrinkage ≤10.0% in at least one direction, 130° C. TD heat shrinkage ≤25.0%, a 170° C. TD heat shrinkage ≤55.0%, and a normalized pin puncture strength ≥$1.4\times10^2$ mN/μm.

11. A battery separator film comprising the membrane of claim 1.

12. A battery separator film comprising a layer containing a polymer blend, the polymer blend comprising 60.0 wt. % to 70.0 wt. % polypropylene, 3.0 wt. % to 6.0 wt. % polymethylpentene, and 24.0 wt. % to 37.0 wt. % of a polyethylene, based on the weight of the polymer blend, wherein battery separator film has an Electrochemical Stability ≤55.0 mAh, a thickness ≤50.0 μm and a normalized air permeability ≤40.0 seconds/100 cm³/μm.

13. A battery separator film comprising a layer containing a polymer blend, the polymer blend comprising 57.0 wt. % to 67.0 wt. % polypropylene, more than 6.0 wt. % and 12.0 wt. % or less polymethylpentene, and 21.0 wt. % to 37.0 wt. % of a polyethylene, based on the weight of the polymer blend, wherein battery separator film has an electrochemical stability ≤25.0 mAh and a thickness ≤50.0 μm.

14. The battery separator film of claim 12, wherein the battery separator film has a 130° C. TD heat shrinkage ≤25.0%, a 170° C. TD heat shrinkage ≤55.0%, and a normalized pin puncture strength ≥$1.4\times10^2$ mN/μm.

15. The battery separator film of claim 12, wherein the layer is a skin layer.

16. The battery separator film of claim 12 further comprising: (i) a second skin layer having substantially the same composition as the first skin layer and (ii) a core layer comprising polyethylene, wherein the battery separator film has a 130° C. TD heat shrinkage ≤25.0%, a 170° C. ID heat shrinkage ≤55.0%, and a normalized pin puncture strength ≥$1.4\times10^2$ mN/μm.

17. The battery separator film of claim 13, further comprising: (i) a second skin layer having substantially the same composition as the first skin layer and (ii) a core layer comprising polyethylene, wherein the battery separator film has a 130° C. TD heat shrinkage ≤25.0%, a 170° C. TD heat shrinkage ≤55.0%, and a normalized pin puncture strength ≥$1.4\times10^2$ mN/μm.

18. A lithium ion battery comprising the battery separator film of claim 12.

19. The membrane of claim 2, wherein the membrane has a thickness ≤50.0 μm, a meltdown temperature ≥170.0° C., and a normalized air permeability ≤50.0 seconds/100 cm3/μm.

20. The membrane of claim 4, wherein the polymethylpentene has an MFR in the range of from 0.1 dg/min to 28.0 dg/min and a Tm in the range of 223.0° C. to 235.0° C.

21. The membrane of claim 4, wherein the membrane further comprises a third layer, the third layer having a composition substantially the same as that of the first layer, the second layer being located between the first and third layers.

22. The membrane of claim 6, wherein the membrane further comprises a third layer, the third layer having a composition substantially the same as that, of the first layer, the second layer being located between the first and third layers.

23. The membrane of claim 2, wherein the membrane has one or more of a porosity ≥20.0%, a normalized pin puncture strength ≥1.0×102 mN/μm, and a 105° C. heat shrinkage ≤10.0% in at least one direction.

24. The membrane of claim 4, wherein the membrane has one or more of a porosity ≥20.0%, a normalized pin puncture strength ≥1.0×102 mN/μm, and a 105° C. heat shrinkage ≤10.0% in at least one direction.

25. The membrane of claim 4, wherein the membrane has one or more of a porosity ≥20.0%, a normalized pin puncture strength ≥1.0×102 mN/μm, and a 105° C. heat shrinkage ≤10.0% in at least one direction.

26. A battery separator film comprising the membrane of claim 2.

27. A battery separator film comprising the membrane of claim 4.

28. A battery separator film comprising the membrane of claim 6.

29. The battery separator film of claim 13, wherein the battery separator film has a 130° C. TD heat shrinkage ≤25.0%, a 170° C. TD heat shrinkage ≤55.0%, and a normalized pin puncture strength ≥1.4×102 mN/μm.

30. The battery separator film of claim 13, wherein the layer is a skin layer.

31. A lithium ion battery comprising the battery separator film of claim 12.

32. A lithium ion battery comprising the battery separator film of claim 16.

33. A lithium ion battery comprising the battery separator film of claim 17.

* * * * *